US005842680A

United States Patent [19]
Bustamante et al.

[11] Patent Number: 5,842,680
[45] Date of Patent: Dec. 1, 1998

[54] ACTUATOR USING MAGNETIC FORCES TO REDUCE FRICTIONAL FORCES

[75] Inventors: Eleazor Felipe Bustamante, New Hamburg; Phillip G. Adams, Etokecoke; Catherine Hoskin; David Yan Leng, both of Mississauga, all of Canada

[73] Assignee: CTS Corporation, Elkhart, Ind.

[21] Appl. No.: 927,330

[22] Filed: Sep. 11, 1997

[51] Int. Cl.$^6$ .................................................. F16K 31/08
[52] U.S. Cl. ........................... 251/65; 251/160; 251/192; 251/158; 251/208; 251/129.11
[58] Field of Search .................................. 291/160, 192, 291/158, 208, 129.11, 129.15, 129.01, 65

[56] References Cited

U.S. PATENT DOCUMENTS

| | | |
|---|---|---|
| 2,675,831 | 4/1954 | Jacques . |
| 2,777,993 | 1/1957 | Braden ...................................... 251/65 |
| 4,299,252 | 11/1981 | Reinicke . |
| 4,304,256 | 12/1981 | Taiani . |
| 4,428,558 | 1/1984 | Odogaki et al. . |
| 4,440,382 | 4/1984 | Pruvot et al. ............................ 251/192 |
| 4,496,134 | 1/1985 | Idogaki et al. . |
| 4,546,338 | 10/1985 | Idogaki et al. ....................... 251/129.11 |
| 4,647,010 | 3/1987 | Sogabe et al. . |
| 4,747,577 | 5/1988 | Dimock .................................... 251/158 |
| 4,906,880 | 3/1990 | Miura . |
| 5,009,388 | 4/1991 | Pei-gi et al. ............................ 251/160 |
| 5,226,627 | 7/1993 | Hess et al. . |
| 5,234,192 | 8/1993 | Kalippke et al. . |
| 5,259,415 | 11/1993 | Hess et al. . |
| 5,356,112 | 10/1994 | Simar et al. . |
| 5,372,351 | 12/1994 | Oliver . |
| 5,484,133 | 1/1996 | Oliver . |
| 5,611,368 | 3/1997 | Hwang et al. . |

FOREIGN PATENT DOCUMENTS

| | | | |
|---|---|---|---|
| 646792 B | 3/1994 | Australia ................................. 251/65 |
| 55-24251 A | 2/1980 | Japan ...................................... 251/65 |
| 2-181007 A | 7/1990 | Japan ...................................... 251/65 |
| 4-34278 A | 2/1992 | Japan ...................................... 251/65 |
| 4-136578 A | 5/1992 | Japan ...................................... 251/65 |
| 1691641 | 11/1991 | U.S.S.R. ................................. 251/65 |
| 853396 | 11/1960 | United Kingdom ..................... 251/65 |

*Primary Examiner*—Denise L. Ferensic
*Assistant Examiner*—John Ball
*Attorney, Agent, or Firm*—Michael W. Starkweather; Mark P. Bourgeois

[57] ABSTRACT

An actuator for opening and closing a valve with less resistance. The actuator includes a rotor, a stator, a valve and a shaft. The shaft having a first and second end, and an axis extending longitudinally therethrough. The stator, having an electromagnet mounted thereon, and circumferentially mounted around the shaft that extends therethrough. The rotor, fixedly mounted circumferentially around the first end, and having a permanent magnet mounted adjacent to the electromagnet and spaced a first distance therefrom. The valve including a rotary valve and valve seat. The rotary valve, mounted circumferentially around and near the second end, having a valve opening therein. The valve seat, mounted adjacent the rotary valve, having a seat valve opening therein, and fixedly attached to the stator. There actuator is designed for axially moving the rotor from the first distance to a second greater distance from the stator and thereby moving the rotary valve further away from the valve seat, and then axially rotate the shaft to a second position that aligned the seat valve opening and the valve opening, and then moving the rotor from the second distance back to the first lesser distance.

9 Claims, 4 Drawing Sheets

ACTUATOR USING MAGNETIC FORCES TO REDUCE FRICTIONAL FORCES

BACKGROUND OF THE INVENTION

1. Field of the Invention

This invention relates to actuators. Particularly, there is an actuator that uses preset axial magnetic forces both to reduce the force needed to open the valve by eliminating some frictional forces, and to increase the force used in maintaining the valve shut.

2. Description of the Related Art

Various devices and methods of dealing with the complexities of rotary actuators are legion. Examples of patents related to the present invention are as follows, and each patent is herein incorporated by reference for the supporting teachings:

U.S. Pat. No. 5,611,368 is a valve having magnetic force transmission apparatus.

U.S. Pat. No. 5,484,133 is a manual override system for linear magnetically operated valves.

U.S. Pat. No. 5,372,351 is a manual override system for rotary magnetically operated valves.

U.S. Pat. No. 5,356,112 is an electronically controlled valve having a totally leakproof valve plug.

U.S. Pat. No. 5,234,292 is a rotational control device.

U.S. Pat. No. 5,259,415 is a magnetic valve.

U.S. Pat. No. 5,226,627 is a magnetic valve.

U.S. Pat. No. 4,906,880 is an electromagnetic valve having reduced hysteresis.

U.S. Pat. No. 4,647,010 is a combined torque motor and rotary flow control valve unit.

U.S. Pat. No. 4,496,134 is a rotary solenoid actuator.

U.S. Pat. No. 4,428,558 is a proportional solenoid.

U.S. Pat. No. 4,304,256 is a torque transmitting assembly for rotary valve members.

U.S. Pat. No. 4,299,252 is a permanent magnet boosted electromagnetic actuator.

U.S. Pat. No. 2,675,831 is a seatless valve.

The foregoing patents reflect the state of the art of which the applicant is aware and are tendered with the view toward discharging applicants' acknowledged duty of candor in disclosing information that may be pertinent in the examination of this application. It is respectfully stipulated, however, that none of these patents teach or render obvious, singly or when considered in combination, applicant's claimed invention.

3. Problem With The Related Art

A common problem occurring during the actuation of actuators is that attached valves are tightly fitted together, which creates large frictional forces. Therefore, a need exists to eliminate the frictional forces, created from having a tightly fitted valve, that opposes the movement of the valve.

SUMMARY OF THE INVENTION

It is a feature of the invention to provide an actuator that uses preset axial magnetic forces both to reduce the force needed to open the valve by eliminating some frictional forces, and to increase the force used in maintaining the valve shut.

A further feature of the illustrated embodiment is to provide an actuator for opening and closing a valve with less resistance. The actuator includes a rotor, a stator, a valve and a shaft. The shaft having a first and second end, and an axis extending longitudinally therethrough. The stator, having an electromagnet mounted thereon, and circumferentially mounted around the shaft that extends therethrough. The rotor, fixedly mounted circumferentially around the first end, and having a permanent magnet mounted adjacent to the electromagnet and spaced a first distance therefrom. The valve including a rotary valve and valve seat. The rotary valve, mounted circumferentially around and near the second end, having a valve opening therein. The valve seat, mounted adjacent the rotary valve, having a seat valve opening therein, and fixedly attached to the stator. The actuator is designed for axially moving the rotor from the first distance to a second greater distance from the stator and thereby moving the rotary valve further away from the valve seat, and then axially rotating the shaft to a second position that aligns the seat valve opening and the valve opening, and then moving the rotor from the second distance back to the first lesser distance.

The invention resides not in any one of these features per se, but rather in the particular combination of all of them herein disclosed and claimed. Those skilled in the art will appreciate that the conception, upon which this disclosure is based, may readily be utilized as a basis for the designing of other structures, methods and systems for carrying out the several purposes of the present invention. Further, the abstract is neither intended to define the invention of the application, which is measured by the claims, neither is it intended to be limiting as to the scope of the invention in any way.

Figure 1:
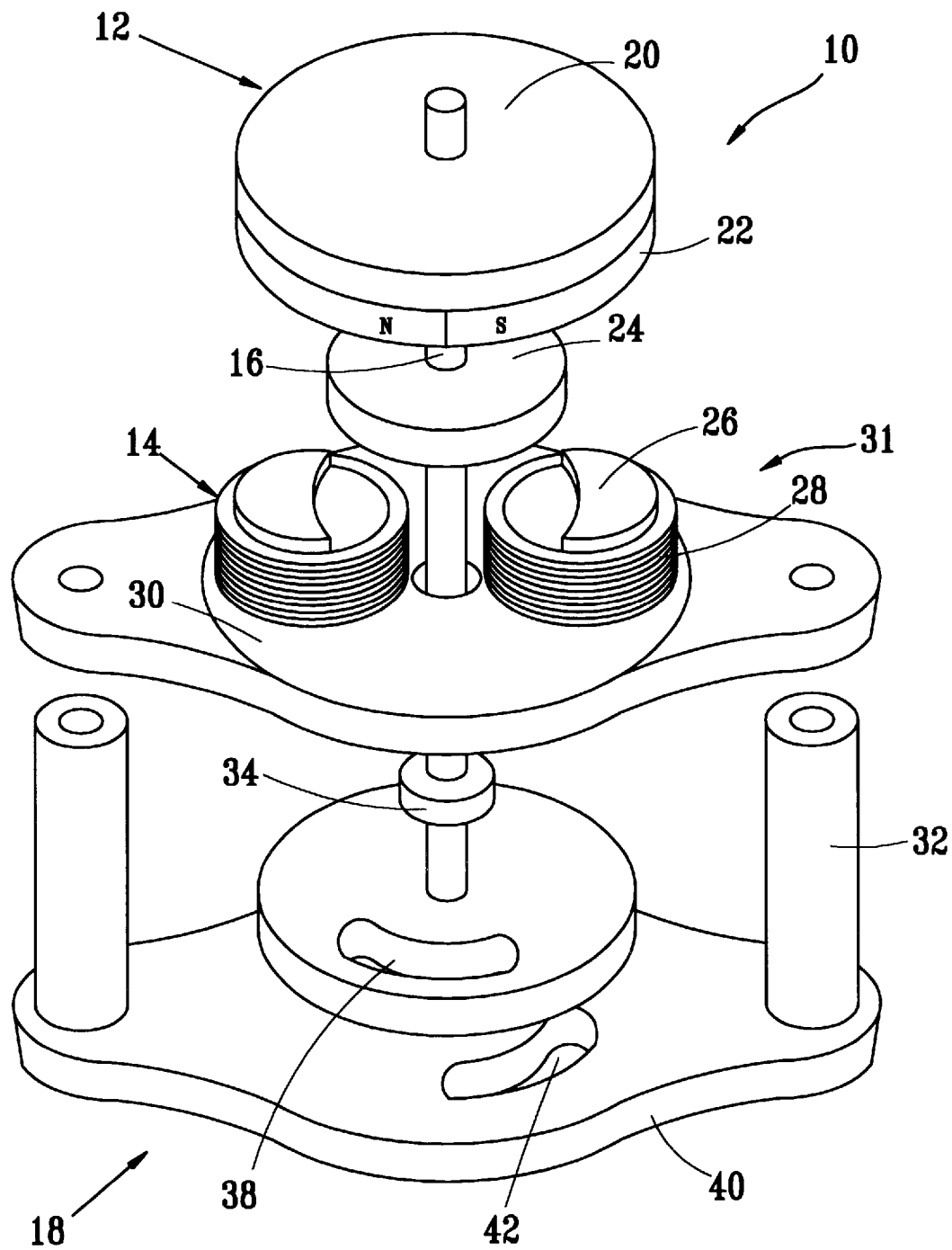
FIG. 1 is perspective exploded view of the preferred embodiment.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements between the drawings.

DETAILED DESCRIPTION OF THE PREFERRED EMBODIMENT

The present invention provides an actuator that uses preset axial magnetic forces both to reduce the force needed to open the valve by eliminating some frictional forces, and to increase the force used in maintaining the valve shut. Regarding FIG. 1, there is a preferred embodiment actuator 10 (also referred to as a valve device). In particular, actuator 10 includes a rotor 12, stator 14, shaft 16, and valve 18. The rotor 12 includes a base plate 20, and permanent magnets 22. A thrust bearing 24, separates the rotor 12 from the stator 14. The stator includes an armature core 26, a coil 28, and base plate 30. Between the stator and the valve is a spacer 32, and a collar 34 both for spacing therebetween. The valve includes a rotary valve 36 with a rotary valve opening 38, a valve seat 40 with a fixed valve opening 42. The armature core 26 and coil 28 form an electromagnet 31.

Figure 2:
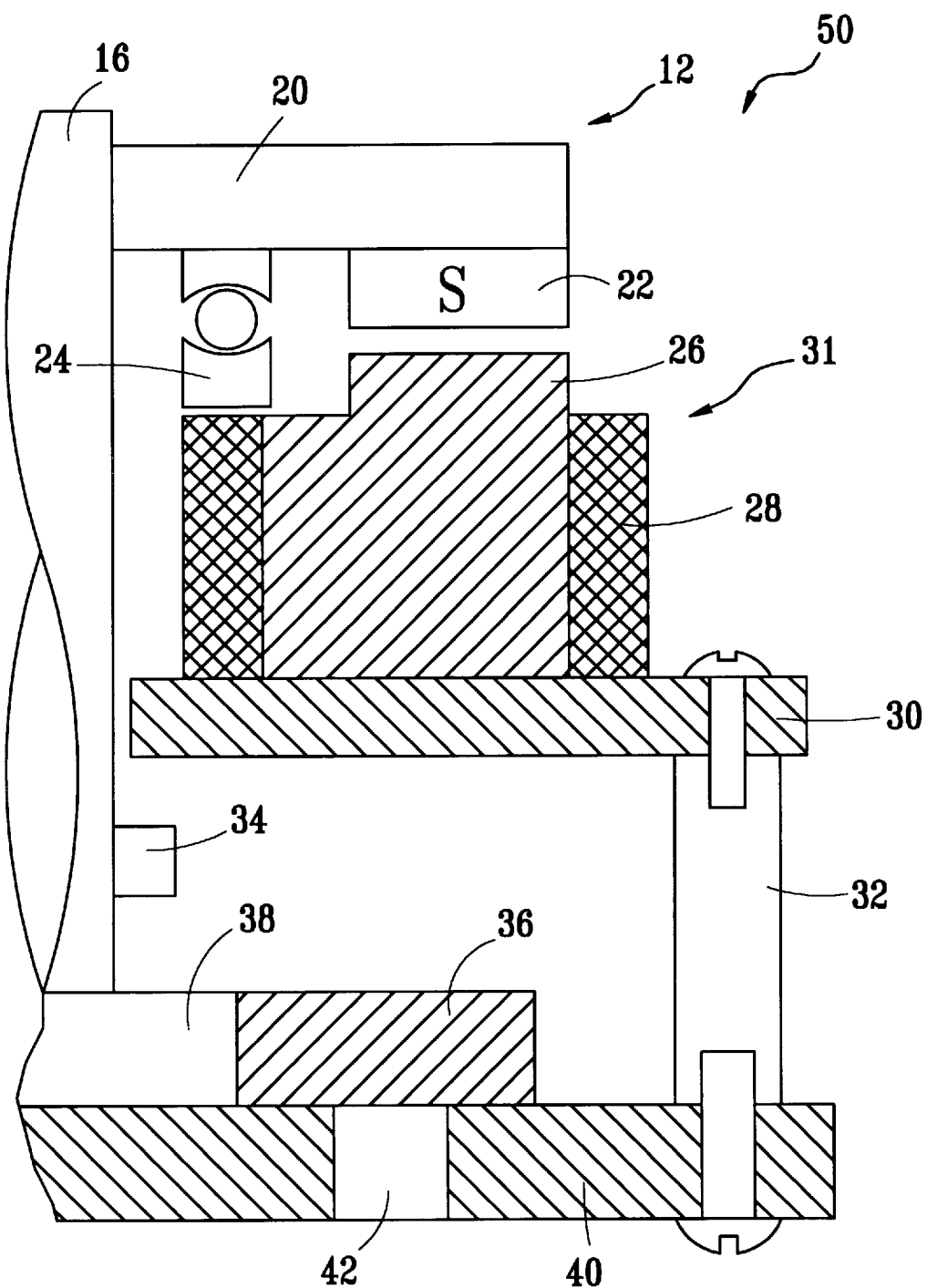
FIG. 2 is a cross section of one side of the preferred embodiment illustrating the closed valve position.
Figure 3:
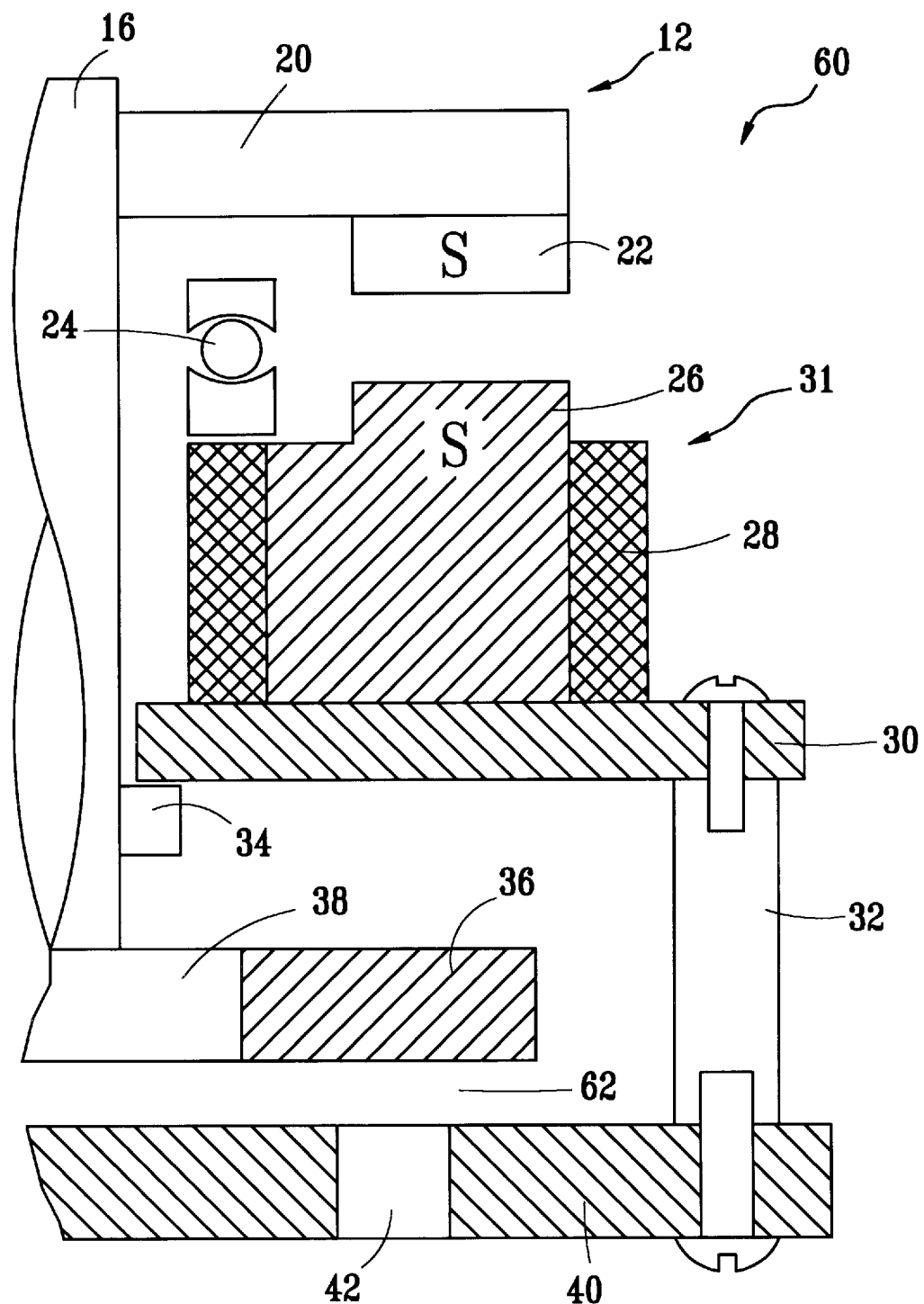
FIG. 3 is a cross section of one side of the preferred embodiment illustrating the valve moving position.
Figure 4:
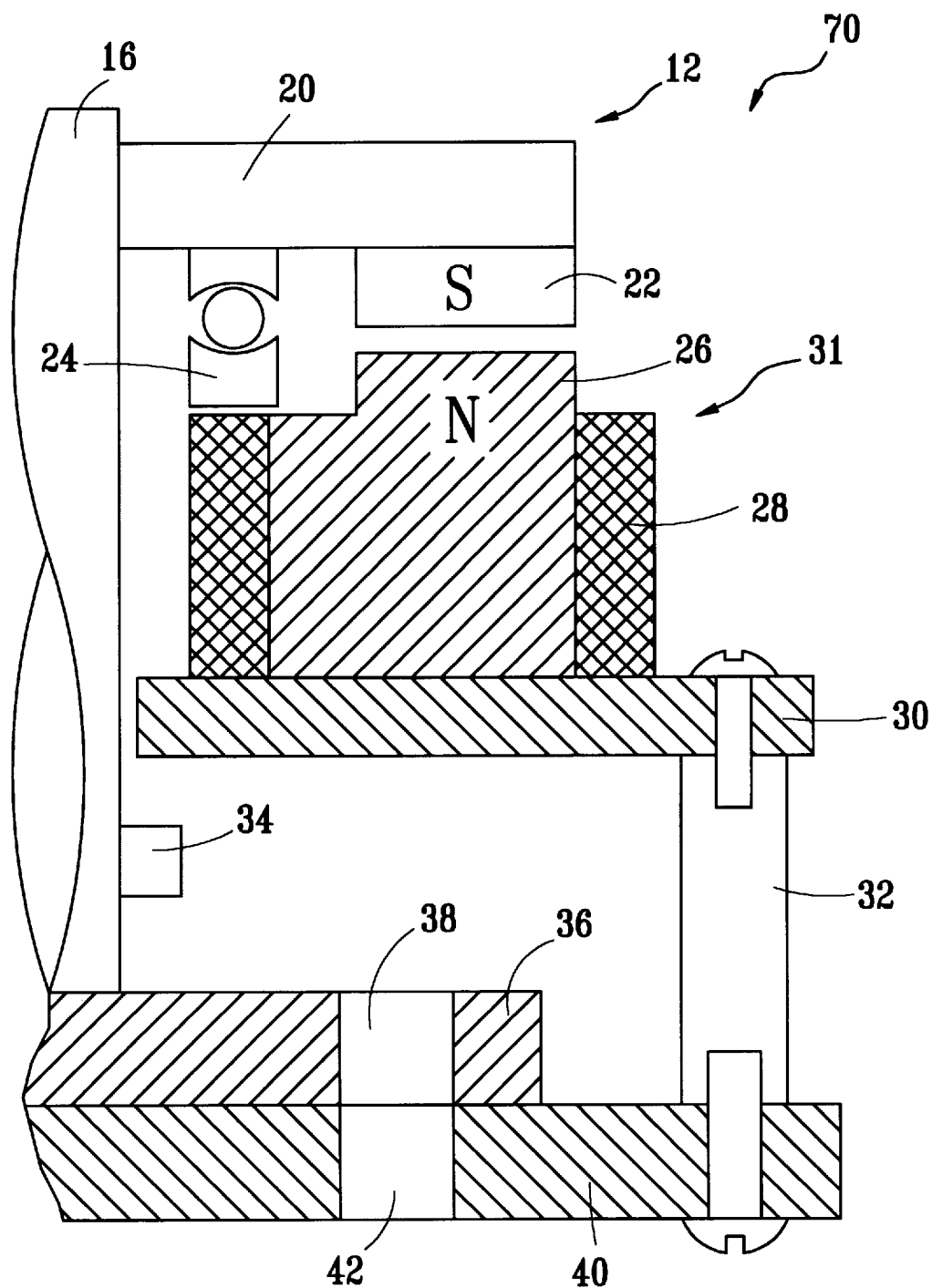
FIG. 4 is a cross section of one side of the preferred embodiment illustrating the open valve position.

Referring to FIG. 2–4, there is illustrated the three key positions of operation for the reduced friction actuator 10. Specifically, in FIG. 2, there is illustrated a closed valve position 50. Where the rotary valve opening 38 is not aligned with the fixed valve opening 42.

In FIG. 3, there is illustrated a separated valve position 60. Where the rotary valve 36 is spaced from the valve seat 40 by air gap 62.

In FIG. 4, there is illustrated an open valve position 70. Where the rotor 12 has the two valve openings 38 and 42 aligned and the rotary valve 36 is again closely positioned next to the valve seat.

In operation of the preferred embodiment, the valve is first in a closed position 50. Where the rotary valve opening 38 is not aligned with the fixed valve opening 42 and the rotary valve 36 is tightly fit adjacent to the valve seat 40 as a result of the permanent magnet 22 attracting the non-energized armature core 26. In FIG. 3, the rotary valve 36 has been separated from the valve seat 40 as a result of sending a current through coil 28, which causes the armature core 26 to become a magnet having the same polarity as the adjacent permanent magnet 22, in the instant illustration both have a south "S" polarity. In FIG. 4, the open valve position 70 is created when the rotor 12 has rotated as a result of the repulsive and attractive magnetic forces between the permanent magnets 22 and oppositely polarized armature cores 26. Uniquely, as the rotor approaches the optimum magnetically attractive position the axial displacement will decrease to a point that allows the rotary valve 36 to tightly fit adjacent the valve seat 40.

Remarks About the Preferred Embodiment

One of ordinary skill in the art of designing and using actuator controlled valves will realize many advantages from studying and using the preferred embodiment. For example, since the rotary valve 36 separates from the valve seat 40 before rotating to an open position there is an elimination of the prior art frictional forces that opposed the rotation of the rotary valve 36. A skilled artisan will realize that the shaft is so mounted to allow axial displacement to allow for the up and down motion of the rotor and attached valve. Also, an artisan knows that the axial motion of the valve 36 will be directed along the main axis of the shaft 16.

It is easily understood that spacers 32 determine the spacing between permanent magnets 22 and armature cores 26, and that the resultant magnetic forces therebetween can be adjusted by changing the length of spacers 32. As a result, the length of spacers 32 will have a direct impact on the amount of pressure rotary valve 36 exerts on valve seat 40 in both the open and closed positions. Furthermore, collar 34 and spacers 32 are used to maintain a proper spacing between stator 14 and valve 18 during the axial motion of the rotary valve 36.

Of particular note, the preferred embodiment has a three step process for opening and closing the valve 18. The first separates the two valve parts, the second rotates the rotary valve, the third forces the two valves parts together again. This sequence occurs during both the opening and closing of the valve 18.

Variations of the Preferred Embodiment

Although the illustrated embodiments discuss the arrangement of the actuator 10 using only two armature cores 26, it is contemplated to use any number of armature cores wherein each adjacent core is oppositely polarized when the coils are energized. Additionally, it is equally contemplated to use the concept of the preferred embodiment in a linear actuator. Where the moving valve portion 36 will be disengaged from the fixed position valve portion 40 when the repulsive forces are created between the rotor 12 and stator 14. The preferred embodiment illustrates the starting position of the valve to be closed. However, it is contemplated to have the valve start in the open position and move to the closed position.

The present embodiment shows the use of spacers 32 and collars 34 to maintain both the proper spacing between the stator and valve and the rotor and stator during any resulting axial motion. However, there are many ways to provide this needed displacement during operation. For example, one end of the shaft could be coupled in a retaining cavity that allows for axial displacement, or the base plate 30 could be molded with an extension that allowed for needed axial motion but limited the axial displacement of the rotary valve 36, like a tab extending downward therefrom. Therefore, any known device that limits the axial but allows for rotational movement would work.

The current embodiment shows a valve opening on the rotary valve, however there are many ways to create an open and closed position. For example, the rotary valve 36 could be a thick spoke, like on a bike tire, that is positioned over the seat valve opening 42 to close the valve 18, and moved thereof when opening the valve 18. Therefore, any known valve device would work.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the description. All changes that come within the meaning and range of equivalency of the claims are to be embraced within their scope.

What is claimed and desired to be secured by United States Patent is:

1. An actuator for opening and closing a valve, comprising:

a) a shaft having a first and second end, and an axis extending longitudinally therethrough;

b) a stator, having an electromagnet mounted thereon, and circumferentially mounted around the shaft that extends therethrough;

c) a rotor, fixedly mounted circumferentially around the first end, and having a permanent magnet mounted adjacent to the electromagnet and spaced a first distance therefrom;

d) a rotary valve, mounted circumferentially around and near the second end, having a valve opening therein;

e) a valve seat, mounted adjacent the rotary valve, having a seat valve opening therein, and fixedly attached to the stator;

f) the stator positioned intermediate the rotor and the rotary valve; and g) means for axially moving the rotor from the first distance to a second greater distance from the stator and thereby moving the rotary valve further away from the valve seat, and then axially rotate the shaft to a second position that aligned the seat valve opening and the valve opening, and then moving the rotor from the second distance back to the first lesser distance.

2. A valve device that opens and closes a valve opening, comprising:

a) a fixed valve;

b) a movable valve that is positioned and designed to move from an open position to a closed position; and c) electromagnetic actuator means, having a shaft extending through the electromagnetic actuator means and having the movable valve coupled to an end of the shaft, for electromagnetically actuating the movable valve, via the shaft, between the open and closed positions by first displacing the movable valve away from relative contact with the fixed valve, rotating the movable valve to either the open or closed position, and then displacing the movable valve into relative contact with the fixed valve.

3. The device according to claim 2, wherein the actuator means includes:

a) a stator, having an electromagnet mounted thereon, and circumferentially mounted around the shaft that extends therethrough;

b) a rotor, fixedly mounted circumferentially around the shaft, and having a permanent magnet mounted adjacent to the electromagnet and spaced a first distance therefrom, the stator mounted between the rotor and the movable valve.

4. The valve device according to claim 3, wherein the fixed valve is opposed to the movable valve, and is attached to the stator.

5. A valve device that opens and closes a valve opening, comprising:

a) a movable valve that is positioned and designed to move from a first position to a second position that will open and close the valve opening; and b) an actuator that moves the movable valve between the open and closed positions including:

b1) a shaft having a first and second end, and an axis extending longitudinally therethrough, the second end coupled to the movable valve;

b2) a rotor, fixedly mounted circumferentially around the first end, and having a permanent magnet mounted adjacent to an electromagnet and spaced a first distance therefrom; and b3) a stator, having the electromagnet mounted thereon, and circumferentially mounted around the shaft that extends therethrough, the stator mounted between the rotor and the movable valve.

6. The valve device according to claim 5, wherein a fixed valve is opposed the movable valve, the actuator first forcing the movable valve away from the fixed valve, moving the movable valve to either the open or closed position, and then forcing the movable valve toward the fixed valve.

7. The valve device of claim 5, wherein the actuator is a rotary actuator and the movable valve is a rotary movable valve.

8. The valve device of claim 5, wherein the movable valve is a rotary valve, mounted circumferentially around and near the second end, and has a valve opening therein.

9. The valve device of claim 6, wherein the fixed valve, mounted adjacent the rotary valve, has a valve opening therein, and fixedly attached to the stator.

* * * * *